(12) United States Patent
Nieto

(10) Patent No.: US 7,448,632 B1
(45) Date of Patent: Nov. 11, 2008

(54) ADJUSTABLE TRIAGE HANDCART

(76) Inventor: Francisco A. Nieto, 7851 S. Avenida de Pina, Tucson, AZ (US) 85747

( * ) Notice: Subject to any disclaimer, the term of this patent is extended or adjusted under 35 U.S.C. 154(b) by 1085 days.

(21) Appl. No.: 10/379,869

(22) Filed: Mar. 5, 2003

(51) Int. Cl.
B62B 1/04 (2006.01)

(52) U.S. Cl. ............ 280/47.24; 280/47.27; 280/47.18; 280/47.315; 5/627

(58) Field of Classification Search ............... 280/640, 280/652, 655.1, 47.131, 47.17, 47.18, 47.23, 280/47.24, 47.27, 47.29, 47.36; 5/625, 626, 5/627

See application file for complete search history.

(56) References Cited

U.S. PATENT DOCUMENTS

| | | | | |
|---|---|---|---|---|
| 4,114,916 A | * | 9/1978 | Oyama | 280/47.29 |
| 4,561,674 A | * | 12/1985 | Alessio | 280/655 |
| 4,570,961 A | * | 2/1986 | Chateauneuf et al. | 280/47.18 |
| 5,080,387 A | * | 1/1992 | Ryals | 280/645 |
| 5,179,746 A | * | 1/1993 | Rogers | 5/625 |
| 5,249,823 A | * | 10/1993 | McCoy et al. | 280/656 |
| 5,328,192 A | * | 7/1994 | Thompson | 280/47.24 |
| 5,472,004 A | | 12/1995 | Gilliard | |
| 5,476,282 A | * | 12/1995 | Dahl | 280/651 |
| 5,626,150 A | | 5/1997 | Johnson et al. | |
| 5,779,252 A | * | 7/1998 | Bolton, Jr. | 280/47.371 |
| 5,806,868 A | * | 9/1998 | Collins | 280/79.6 |
| D403,423 S | | 12/1998 | Bologovsky et al. | |
| 5,871,220 A | | 2/1999 | Lombard | |
| 6,109,644 A | * | 8/2000 | Cox | 280/652 |
| 6,302,414 B1 | * | 10/2001 | Berthiaume et al. | 280/47.18 |
| 6,386,560 B2 | | 5/2002 | Calendar | |
| 6,419,244 B2 | * | 7/2002 | Meabon | 280/47.27 |
| 6,467,486 B1 | | 10/2002 | Kleinschmidt | |
| 6,685,200 B1 | * | 2/2004 | Giannoni et al. | 280/47.35 |
| 6,685,214 B2 | * | 2/2004 | Gregory | 280/652 |
| 2002/0002977 A1 | | 1/2002 | Tyrrell | |
| 2003/0189303 A1 | * | 10/2003 | Ciminelli | 280/47.34 |

* cited by examiner

Primary Examiner—Jeffrey J Restifo
(74) Attorney, Agent, or Firm—Gavin J. Milczarek-Desai; Quarles & Brady LLP

(57) ABSTRACT

An adjustable handcart that provides a horizontal platform for transporting items of cargo or people, such as a patient immobilized upon a spine board. The handcart includes a platform and a platform extension slidably connected at one end and held in place by a lock mechanism. A wheel assembly extends downwardly from the platform to support the platform in a substantially horizontal position off the ground. On the end opposite the platform extension, handles are attached. The handles may be detachable and/or rotatable (to facilitate folding), thereby allowing the handcart to be easily cleaned, stacked, or compacted as needed.

18 Claims, 4 Drawing Sheets

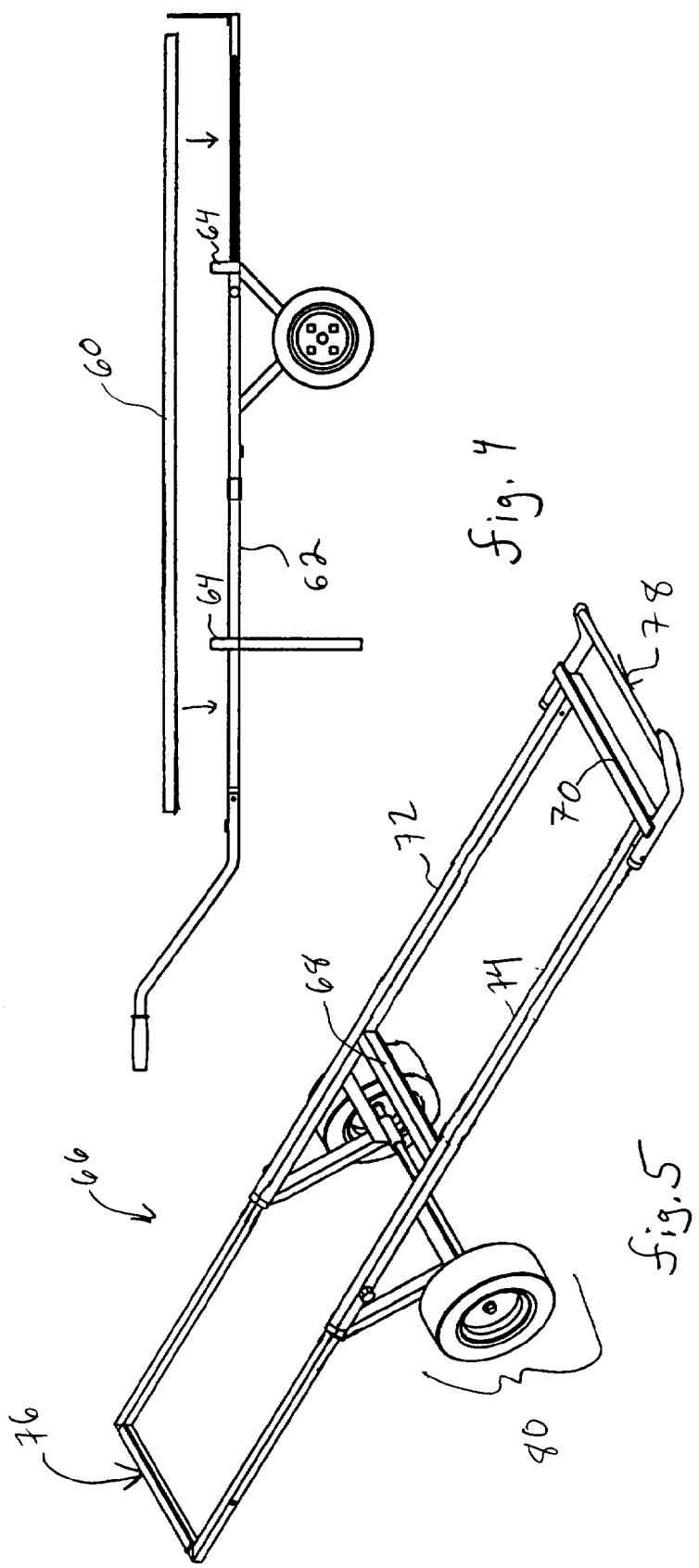

ADJUSTABLE TRIAGE HANDCART

BACKGROUND OF THE INVENTION

1. Field of the Invention

This invention relates generally to adjustable wheeled devices for manually transporting people or cargo and more particularly to a handcart that is especially useful for transporting people or supplies during mass triage situations.

2. Description of the Related Art

Many different wheeled devices for manually transporting persons or items of cargo are known to exist. Indeed, devices such as wheelchairs, gurneys, handcarts, or dollies are used everyday to transport everything from injured people to kitchen appliances. Many of these devices utilize extendable and retractable platforms to enable compaction of the device into a small space or to adjust the carrying area of the device to accommodate different size loads.

More specifically, adjustable dollies exist that allow for different size or weight loads to be removably attached to the dolly while preventing excessive movement of the load during transport. For example, U.S. Pat. No. 6,386,560 discloses a dolly that includes a dropped center floor area, with pivoting casters disposed at each corner thereof beneath a raised end portion at each end of the dropped center floor. While the dropped central floor area provides the lowest possible overall height (only 1.5 inches from the ground) for overhead clearance through standard doorways, such a design requires bending over to near ground level to retrieve cargo. Moreover, this dolly cannot be used to transport supine patients.

In a medical context, spine board dolly apparatuses, such as that disclosed by U.S. Pat. No. 5,871,220 issued to Lombard, allow the conversion of an ordinary spine board into a wheeled transport device. Lombard's invention essentially consists of a sleeve with wheels that slips over and is attached with a belt to one end of a spine board. While this invention provides a clever way for a single person to transport a patient or cargo on a platform, the spine board is not kept in a preferred horizontal position and has a relatively high center of gravity. This can result in dumped cargo or can leave a patient uncomfortable and at risk of further injury from being tipped over or dropped. Moreover, each of Lombard's apparatuses must be assembled before use, which could cost precious time in a mass casualty situation.

Thus, there remains a need in the art for an adjustable handcart that is adaptable for use with both people and cargo, is easy to clean and disassemble, can be operated by a single person, stores compactly in stacks, and keeps passengers or cargo in a stable, horizontal position.

SUMMARY OF THE INVENTION

The invention relates in general to adjustable handcarts. More particularly, the invention relates to horizontal handcarts that can be used to transport items of cargo or patients immobilized upon spine boards. In one embodiment, the handcart of the invention includes a substantially horizontal platform and a platform extension slidably connected at one end and held in place by a lock mechanism. To support the horizontal platform off the ground, a wheel assembly is attached to the bottom side of the platform. On the end opposite the platform extension, handle means are attached. The handle means may be detachable and/or rotatable (to facilitate folding), thereby allowing the handcart to be easily cleaned, stacked, or compacted as needed.

The platform extension allows the handcart to change size in order to accommodate items of various lengths, such as a pediatric or adult size spine board. Preferably, clamp assemblies, stop tabs or plates, friction strips, and a stand are also included on the platform to ensure the secure attachment of items and to make the platform self-standing in a substantially horizontal position.

Thus, the present invention provides significant advancement over the known related art by enabling a single person to readily transport a patient or supplies of a wide range of sizes in a stable, substantially horizontal position.

Therefore, it is a primary objective of the invention to provide a handcart that is adjustable for different size loads.

Further, an object of the invention is to provide an adjustable handcart that stays substantially horizontal when stationary or moving.

Another object of the invention is to provide an adjustable handcart that can be operated by a single person.

Still another object of the invention is to provide an adjustable handcart that is easy to disassemble and clean.

Yet another object of the invention is to provide an adjustable handcart that facilitates stacking and storage.

An additional object of the invention is to provide an adjustable handcart that is durable, economical to produce and inexpensive to utilize.

Various other purposes and advantages of the invention will become clear from its description in the specification that follows. Therefore, to the accomplishment of the objectives described above, this invention includes the features hereinafter fully described in the detailed description of the preferred embodiments, and particularly pointed out in the claims. However, such description discloses only some of the various ways in which the invention may be practiced.

BRIEF DESCRIPTION OF THE DRAWINGS

FIG. 4 shows an elevational view of an embodiment of the invention that features a removable spine board.

FIG. 5 depicts in side perspective view a basic alternative embodiment of the invention.

DETAILED DESCRIPTION OF THE PREFERRED EMBODIMENTS

The invention generally relates to a handcart featuring a platform with an extension that adjusts in length between a compact and an extended state to accommodate items of various sizes. The handcart of the invention is suspended off the ground in a substantially horizontal position by a wheel assembly and, preferably, a stand. A handle or handles are attached to the platform on the end opposite to the platform extension and are preferably removable and rotatable for easy cleaning and storage.

The invention is especially useful in mass triage situations due to its ease of handling, stability, and adaptability in accommodating loads (e.g., spine boards) of various sizes. Moreover, the preferred embodiment of the invention allows one to compactly stack a plurality of carts at a desired location, thereby enabling a large-scale response in areas with a high density of people (e.g., airports, sports stadiums, etc.).

Figure 1:
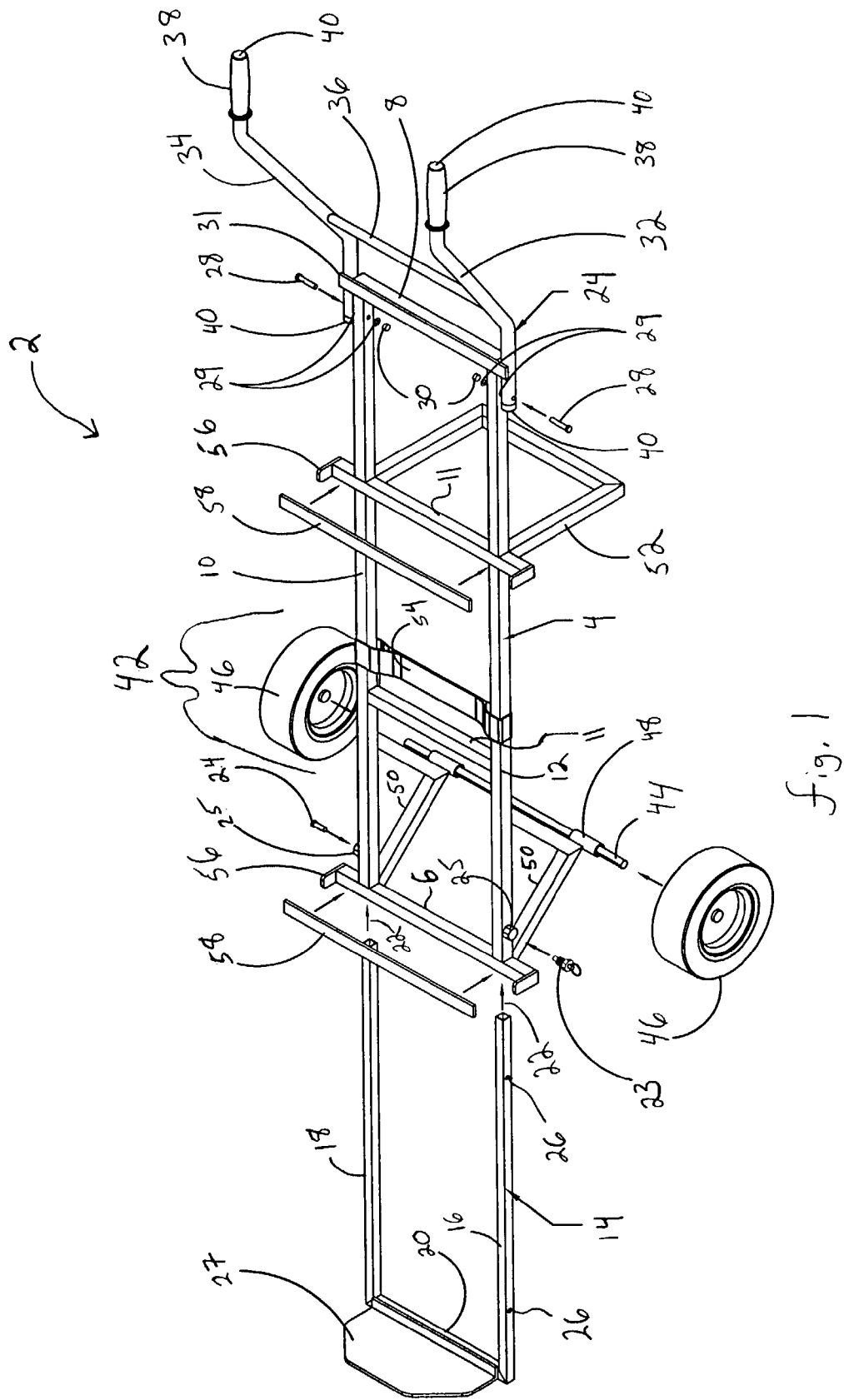
FIG. 1 depicts an exploded side perspective view of a preferred embodiment of the invention.

Turning to FIG. 1, a preferred handcart 2 of the invention is shown in an exploded, side perspective view. The handcart 2 has a platform 4 that includes a first end 6 and a second end 8 that are connected to a first side bar 10 and a second side bar 12. Ideally, one or more crossbars 11 may be welded or otherwise affixed to the platform 4 in increase durability. A platform extension 14 having a first side piece 16, a second side piece 18 and a connecting end 20 is manufactured such that the platform extension 14 slidably engages first end 6 of platform 4 in coaxial alignment with first and second side bars 10 and 12 (as shown by arrows 22). Platform extension 14 is then secured in a predetermined position with pull pin 23 and removable bolt 24, each of which is placed through, and secured to, a nut 25. In this case, the position of the platform extension 14 is determined by locking the pull pin 23 and removable bolt 24 into a desired hole 26. Preferably, a stop plate 27 is also attached to end 20 (or formed as a single piece with end 20) to provide a means for better securing a load to the handcart 2.

Although not illustrated herein, it would be understood by one skilled in the art that the platform of the invention may take other forms without departure from the invention. For example, the platform might be manufactured from a single piece of light, flat metal with brackets on one end to slidably engage the platform extension. Thus, the preferred embodiment should not be construed to limit the invention to the particular structure just described.

Proximate to the second end 8 of platform 4, handles 24 are connected with an variety of known joining means, such as bolts 28, washers 29, and nuts 30. Preferably, the joining means allow the handles 24 to be rotatable (for compactness during storage) in the plane defined by the platform and removable for decontamination/cleaning. In such a case, a stop tab 31 extends from the second end 8 to prevent rotation of the handles 24 past the point of horizontal alignment with side bars 10 and 12. The handles 24 are ideally made up of a pair of handle bars 32 and 34 connected by a bar 36 for added durability. For added comfort and safety, soft hand-grips 38 and end caps 40 may be added to the handle bars 32 and 34 as shown.

Mounted proximally to the first end 6 of platform 4 is wheel assembly 42, which includes an axle 44 and wheels 46. Preferably, the axle 44 is threaded through a pair of pipe sections 48 that are welded or otherwise attached to a pair of angled support bars 50. Although it is not shown, it should be understood that a single wheel or more than two wheels could be part of the assembly 42 in lieu of design shown. Preferably, the tires on wheels 46 are maintenance free (e.g., puncture proof tires). Also preferred is the addition of a stand 52 extending downwardly from the platform 4 such that the platform is held in a substantially horizontal position when not being held by a user. The stand 52 also helps to prevent accidents or damage to cargo caused by a user dropping the handles 24.

Several accessories can be attached to the platform 4 to increase its versatility. Referring again to FIG. 1, a strap 54 can be added to provide a support for cargo, a stretcher, a spine board, or other item. Moreover, clamp assemblies, such as brackets 56, and friction strips 58 provide a means for securing items to the handcart 2. Preferably, friction strips 58 are made from hard rubber and are attached to the platform with adhesive.

Figure 2A:
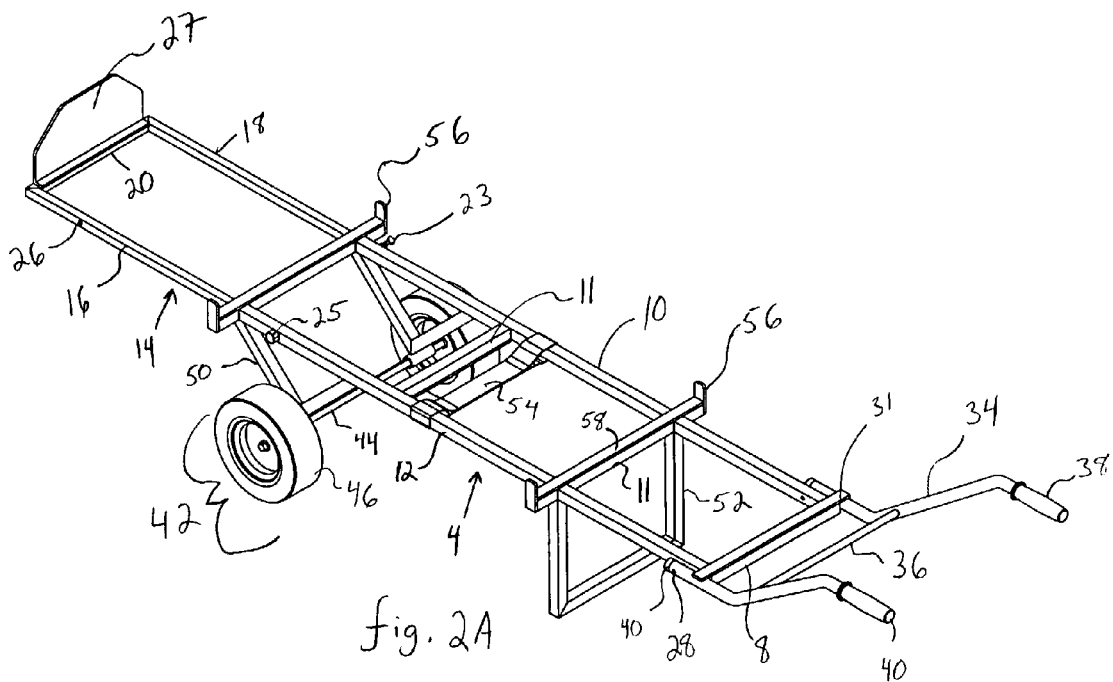
FIG. 2A shows an assembled perspective view of the embodiment of FIG. 1.
Figure 2B:
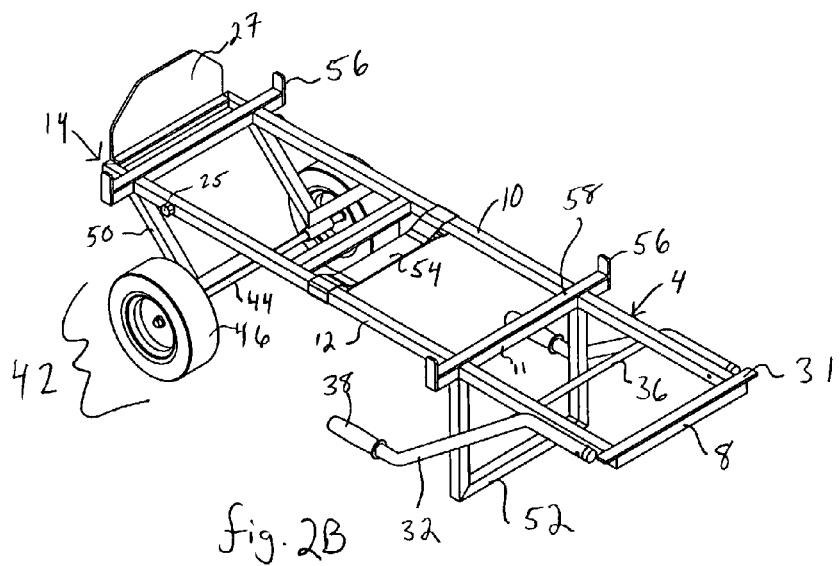
FIG. 2B shows the embodiment of FIG. 2A compacted for storage, with the platform extension all the way in and the handles rotated 180 degrees clockwise from their original position.
Figure 3A:
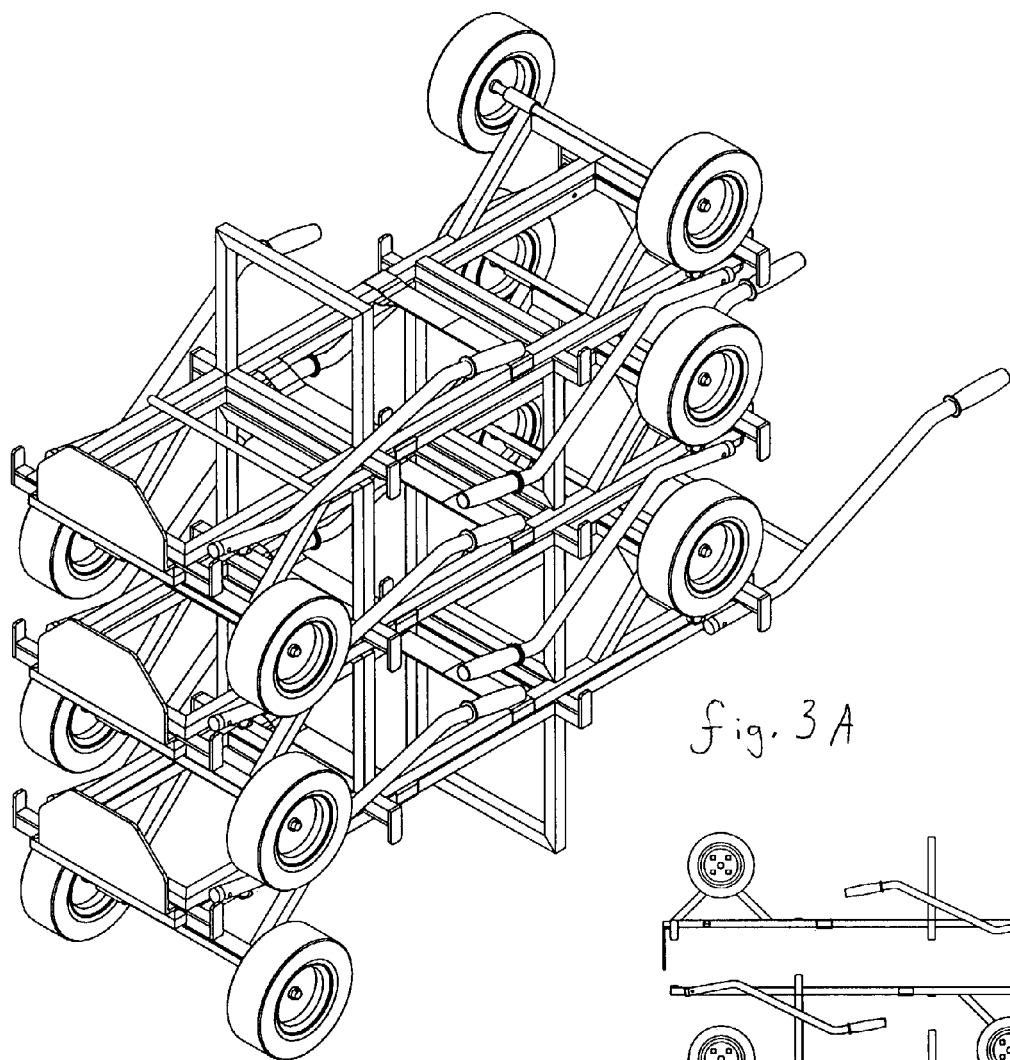
FIG. 3A depicts in perspective view a stack of the compacted handcarts of FIG. 2B.
Figure 3B:
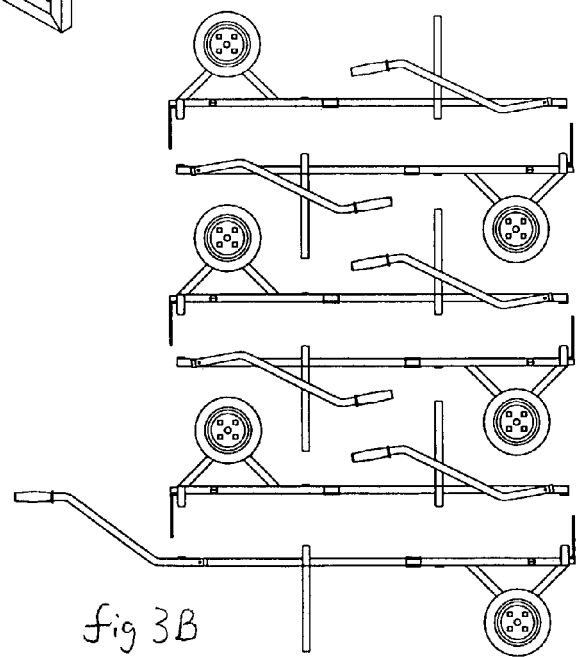
FIG. 3B schematically illustrates in elevational view the same stack shown in FIG. 3A.

As shown in FIGS. 2A and 2B, the handcart of the invention can assume a range of configurations, from fully extended (2A) to full compacted (2B). Moreover, the compacted state facilitates the stacking of handcarts as shown in FIGS. 3A and 3B.

As shown in side elevational view in FIG. 4, the invention is especially useful in combination with a spine board. Hence, a "mobile spine board" is created by securing a spine board 60 to the platform 62 through clamps 64.

Turning to FIG. 5, an alternative embodiment of the invention is shown. Here, the handcart 66 includes a first end 68, a second end 70 and two side bars 72 and 74. A platform extension 76 is slidably attached to the first end 68 as shown in FIG. 1, and a simplified handle means 78 is attached proximal to the second end 70. Wheel assembly 80 then completes the handcart.

As will now be clear from the description above, the handcart of the invention has many advantages over existing carts. Its low profile and center of gravity provides stable mode of transportation for supplies or patients. Moreover, in critical mass casualty situations where "manpower" can be very limited, the invention allows one person to gather and transport victims to a triage center. Furthermore, the compact and lightweight design of the invention allows one person to deploy multiple stacked handcarts or up to 350 lbs. of cargo. Preferably, the platform, platform extension, and handle means of the invention are constructed from aluminum. However, any suitably durable and lightweight material may be utilized. All of these features make the handcart of the invention ideal for rapid deployment applications in both military and civilian settings.

Various changes in the details and components that have been described may be made by those skilled in the art within the principles and scope of the invention herein described in the specification and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

What is claimed is:

1. A handcart, comprising:
a platform having a first end and a second end,
a platform extension slidably connected to said first end of said platform in coaxial alignment therewith,
a lock means for holding said platform extension in a predetermined position,
a wheel assembly attached proximally to said first end of the platform and extending downwardly a predetermined distance from said platform,
a stand attached proximally to said second end of the platform and extending downwardly from said platform substantially the same predetermined distance as said wheel assembly; and
handle means attached to said second end of said platform,
wherein said wheel assembly and said stand are spaced apart such that, when said handcart is positioned upside down, a wheel assembly of a second handcart of the invention is receivable between the stand and said second end, thereby positioning said handcart in substantially horizontal stackable arrangement with said second handcart.

2. The handcart of claim 1, wherein said platform further includes at least one clamp assembly disposed upon a top side thereof.

3. The handcart of claim 1, wherein said platform extension further includes a stop plate extending from a connecting end thereof.

4. The handcart of claim 1, wherein said handle means are rotatable in a plane defined by said platform.

5. The handcart of claim 1, wherein said handle means are removable.

6. The handcart of claim 1, wherein said lock means comprises a pull pin.

7. The handcart of claim 1, wherein said platform further includes a stop tab extending from a top side proximate to said second end.

8. The handcart of claim 1, further including a spine board disposed upon a top side of said platform.

9. A handcart, comprising:
   a platform of parallel spaced-apart rails, said rails each having a first end and a second end,
   a platform extension slidably connected in coaxial alignment to said first end of each rail of said platform, said platform extension held in a predetermined position by a lock means,
   a lock means for holding said platform extension in a predetermined position,
   a wheel assembly attached proximally to said first end of the platform and extending downwardly a predetermined distance from said platform,
   a stand attached proximally to said second end of the platform and extending downwardly from said platform substantially the same predetermined distance as said wheel assembly; and
   handle means attached to said second end of said platform,
   wherein said wheel assembly and said stand are spaced apart such that, when said handcart is positioned upside down, a wheel assembly of a second handcart of the invention is receivable between the stand and said second end, thereby positioning said handcart in substantially horizontal stackable arrangement with said second handcart.

10. The handcart of claim 9, wherein said platform further includes at least one clamp assembly disposed upon a top side thereof.

11. The handcart of claim 9, wherein said platform extension further includes a stop plate extending from a connecting end thereof.

12. The handcart of claim 9, wherein said handle means are rotatable in a plane defined by said platform.

13. The handcart of claim 9, wherein said handle means are removable.

14. The handcart of claim 9, wherein said lock means comprises a pull pin.

15. The handcart of claim 9, wherein said platform further includes a stop tab extending from a top side proximate to said second end.

16. The handcart of claim 15, wherein said handle means rotate and engage said stop tab upon application of a lifting force to said handle means.

17. The handcart of claim 9, further including a spine board disposed upon a top side of said platform.

18. A handcart, comprising:
   a platform having a first end and a second end,
   a wheel assembly attached proximally to said first end of the platform and extending downwardly a predetermined distance from said platform,
   a stand attached proximally to said second end of the platform and extending downwardly from said platform substantially the same predetermined distance as said wheel assembly; and
   handle means attached to said second end of said platform,
   wherein said wheel assembly and said stand are spaced apart such that, when said handcart is positioned upside down, a wheel assembly of a second handcart of the invention is receivable between the stand and said second end, thereby positioning said handcart in substantially horizontal stackable arrangement with said second handcart.

* * * * *